US009191211B2

(12) United States Patent
Melton

(10) Patent No.: US 9,191,211 B2
(45) Date of Patent: Nov. 17, 2015

(54) DATA SECURITY SYSTEM

(75) Inventor: Randall Wayne Melton, Colorado Springs, CO (US)

(73) Assignee: Atmel Corporation, San Jose, CA (US)

( * ) Notice: Subject to any disclaimer, the term of this patent is extended or adjusted under 35 U.S.C. 154(b) by 1226 days.

(21) Appl. No.: 12/395,093

(22) Filed: Feb. 27, 2009

(65) Prior Publication Data

US 2010/0220854 A1 Sep. 2, 2010

(51) Int. Cl.
*H04L 9/06* (2006.01)
*H04L 9/32* (2006.01)
*G06F 21/72* (2013.01)
*H04L 29/06* (2006.01)

(52) U.S. Cl.
CPC .............. *H04L 9/3236* (2013.01); *G06F 21/72* (2013.01); *H04L 9/0643* (2013.01); *H04L 63/123* (2013.01); *H04L 2209/80* (2013.01)

(58) Field of Classification Search
CPC ........... H04L 9/0643; H04L 9/06; H04L 9/28; H04L 9/3223; H04L 9/3236; H04L 9/3239; G06F 21/60; G06F 21/72
USPC ..................................... 380/37; 713/191–192
See application file for complete search history.

(56) References Cited

U.S. PATENT DOCUMENTS

| 4,821,183 | A  | * | 4/1989  | Hauris .......................... 712/243 |
| 4,862,407 | A  | * | 8/1989  | Fette et al. ...................... 712/35 |
| 6,091,821 | A  | * | 7/2000  | Buer ............................... 380/30 |
| 6,108,425 | A  |   | 8/2000  | Smith, Sr. et al. |
| 6,236,727 | B1 | * | 5/2001  | Ciacelli et al. ................ 380/212 |
| 6,378,072 | B1 |   | 4/2002  | Collins et al. |
| 6,901,516 | B1 |   | 5/2005  | Howard et al. |
| 6,983,366 | B1 |   | 1/2006  | Huynh et al. |
| 7,266,703 | B2 |   | 9/2007  | Anand et al. |
| 7,684,563 | B1 | * | 3/2010  | Olson et al. ..................... 380/28 |
| 2005/0089160 | A1 | * | 4/2005 | Crispin et al. .................. 380/28 |
| 2005/0132186 | A1 | * | 6/2005 | Khan et al. ..................... 713/165 |
| 2005/0132226 | A1 |   | 6/2005 | Wheeler et al. |
| 2005/0177749 | A1 |   | 8/2005 | Ovadia |
| 2007/0157030 | A1 | * | 7/2007 | Feghali et al. ................ 713/189 |
| 2011/0264720 | A1 | * | 10/2011 | Feghali et al. ................ 708/209 |

OTHER PUBLICATIONS

Eastlake et al., "US Secure Hash Algorithm 1", Sep. 2001, pp. 1-22, ftp://ftp.isi.edu/in-notes/rfc3174.txt.*
Eatlake et al., "US Secure Hash Algorithm 1", Sep. 2001, pp. 1-22, ftp://ftp.isi.edu/in-notes/rfc3174.txt.*

* cited by examiner

*Primary Examiner* — Jung Kim
*Assistant Examiner* — Carlos M De Jesus Lassala
(74) *Attorney, Agent, or Firm* — Fish & Richardson P.C.

(57) ABSTRACT

A data security system that includes a first memory device to store message data to be secured, a second memory device to store microcode including an instruction set defining a cryptographic algorithm for use in securing the message data, and a processing unit to execute the microcode to implement the cryptographic algorithm.

9 Claims, 4 Drawing Sheets

DATA SECURITY SYSTEM

BACKGROUND

This specification relates to securing data.

Given the proliferation of computing systems and other electronic devices, the security and authenticity of data and data communications are paramount concerns as such data often contain sensitive information (e.g., financial records, medical records, personal information, etc.). Cryptographic algorithms are commonly used to authenticate, secure, and verify the integrity of data and/or data communications. Some cryptographic algorithms, for example, rely upon the use of hash functions, e.g., SHA-1, SHA-256, MD5, RIPEMD, HMAC, etc. Cryptographic schemes utilizing hash functions are often implemented through the use of general purpose computing devices or dedicated, special-purpose hardware. However, implementations based on general purpose computing devices may not be suitable for applications demanding a small form factor, as the versatility offered by such computing devices tends to make them relatively large. Further, implementations based on dedicated, special-purpose hardware may not be a viable option for applications requiring the flexibility to change from use of one cryptographic algorithm to another, e.g., from a cryptographic algorithm implementing SHA-1 to a cryptographic algorithm implementing SHA-256.

SUMMARY

This specification discloses systems for securing data and methods of performing the same. One aspect of the subject matter described in this specification can be embodied in a data security system including a processing unit configurable to execute microcode, a first memory device configurable to store message data to be secured, and a second memory device configurable to store the microcode to be executed by the processing unit. The microcode includes an instruction set defining a cryptographic algorithm for use in securing the message data.

The details of one or more implementations of the subject matter described in this specification are set forth in the accompanying drawings and the description below. Other features, aspects, and advantages of the subject matter will be apparent from the description, the drawings, and the claims.

BRIEF DESCRIPTION OF DRAWINGS

Like reference numbers and designations in the various drawings indicate like elements.

DETAILED DESCRIPTION

§1.0 Example Data Security Environment

Figure 1:
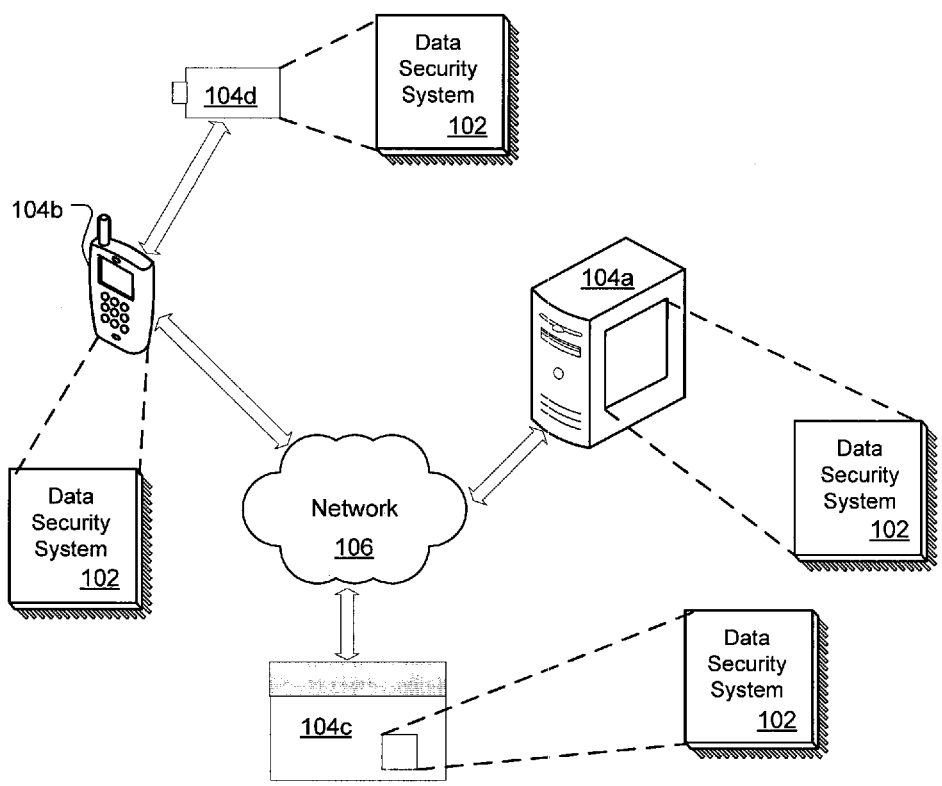
FIG. 1 is a diagram of an example environment in which data security systems and methods can be implemented.

FIG. 1 is a diagram of an example environment in which data security systems and methods can be implemented. A data security system 102 can, for example, be used to facilitate authentication of data and/or data sources, secure data communications between communication devices, and verify the integrity of data. Data security systems 102 can be used by many different devices 104 for various applications. For example, mobile communication device 104b and battery 104d can use data security systems 102 to ensure that battery 104d is authorized for use with mobile communication device 104b. In another example, computing system 104a and mobile communication device 104b can use data security systems 102 to both create and authenticate digital signatures (e.g., as defined by the Digital Signature Standard) for data communications over a network 106 (e.g., the Internet). A secure card device 104c (e.g., a smart card) can, for example, employ a data security system 102 to secure and/or verify identification information.

§2.0 Example Data Security System

Figure 2A:
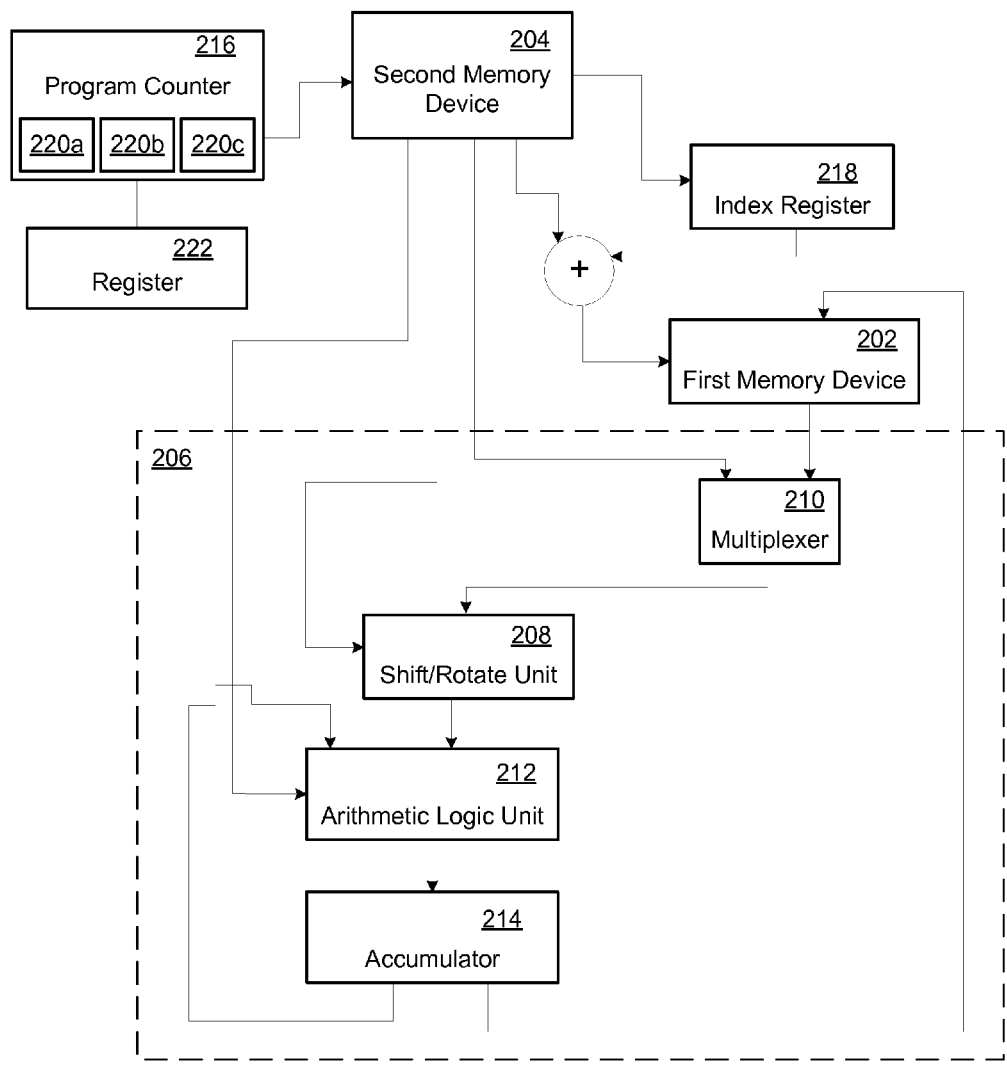
FIG. 2A is a block diagram of an example data security system.

FIG. 2A is a block diagram of an example data security system 102. The data security system 102 (or cryptographic module 102) can be implemented as an integrated circuit. The data security system 102 secures data, for example, for use in authenticating data and/or devices (e.g., battery 104d). Generally, securing data describes a process by which data is systematically manipulated according to a cryptographic algorithm. In some implementations, cryptographic algorithms relying on cryptographic hash functions such as Secure Hash Algorithm 1 ("SHA-1") and Secure Hash Algorithm 256 ("SHA-256") can be used by the data security system 102 to secure data. In some implementations, the data security system 102 can include a first memory device 202, a second memory device 204, and a processing unit 206.

§2.1 Example First Memory Device

The first memory device 202 is a memory device configurable to store message data. The message data is the data that is to be secured by the data security system 102. For example, with reference to the digital signature described above, the message data is the data used to generate the digital signature identifying the sender (e.g., data derived from both the message to be sent and a secret). In one implementation, the first memory device 202 is a volatile memory device such as random access memory, although other memory device architectures can also be utilized.

§2.2 Example Second Memory Device

The second memory device 204 is a memory device configurable to store microcode. The second memory device 204 can be a non-volatile memory device such as read-only memory, although other memory device architectures can also be used. Microcode(s) are low-level instructions used in the implementation of machine language instructions. The second memory device 204 can store microcode that includes an instruction set defining a cryptographic algorithm that can be used to secure the message data stored in the first memory device 202. In some implementations, the second memory device 204 can be configured to accept and store replacement microcode having an instruction set defining another (i.e., different) cryptographic algorithm. In other implementations, the microcode can include more than one instruction set, each instruction set defining a distinct cryptographic algorithm. The second memory device 204 can also include constants associated with the cryptographic algorithm(s). The instruction set includes instructions that define, and correspond to, the steps necessary to execute the cryptographic algorithm. For example, the instructions can define a cryptographic algorithrri that implements a secure hash function (e.g., SHA-1, SHA-256, etc., as defined by the National Institute of Standards and Technology). However, in various implementations, the cryptographic algorithm can implement other functions to secure the message data, e.g., MD5, RIPEMD, HMAC, AES.

Secure hash functions can take an arbitrarily-sized message data block (e.g., a block including a message and a secret) and generate a result data block of a fixed size ("digest"), regardless of the size of the message data block up to a specified maximum. Secure hash functions are also characterized in that identical message data blocks will have identical digests, and that it is improbable that two message data blocks with the same message will have identical digests if each message data block has different secrets. Because of these characteristics, secure hash functions are well suited to securing the message data stored in the first memory device 202. For example, in the context of securing data for use in an authentication process, consider the battery 104$d$ and the mobile communication device 104$b$ discussed above. Each of the battery 104$d$ and the mobile communication device 104$b$ can include a secret (e.g., unique to a manufacturer). During authentication, the mobile communication device 104$b$ can provide a message (e.g., a random number) to the battery 104$d$. The battery 104$d$ and the mobile communication device 104$b$ can each use a data security system 102 to secure (e.g., hash) the message and respective secret (collectively the message data) to generate a digest unique to the message and respective secret. The digest from the battery 104$d$ and the digest from the mobile communication device 104$b$ can be compared (e.g., the digest from the battery 104$d$ can be provided to the mobile communication device 104$b$ for comparison). For example, if the digests are identical, then the battery 104$d$ can be determined to be an authentic/approved battery, as matching secrets are guaranteed to produce identical digests and it is improbable that a guessed secret could produce a matching digest. Thus by hashing the secret and message, the resulting digest (or hash value) can be used, in part, to determine if the battery 104$d$ is authentic without revealing the secret (e.g., without communicating the secret between the battery 104$d$ and the mobile communication device 104$b$).

The size of the second memory device 204, and the first memory device 202, are determined by the type of cryptographic algorithm utilized. For example, a cryptographic algorithm implementing SHA-256 can be accomplished with memory sizes that accommodate a program depth of 220 words and a data depth of 84 words.

Figure 2B:
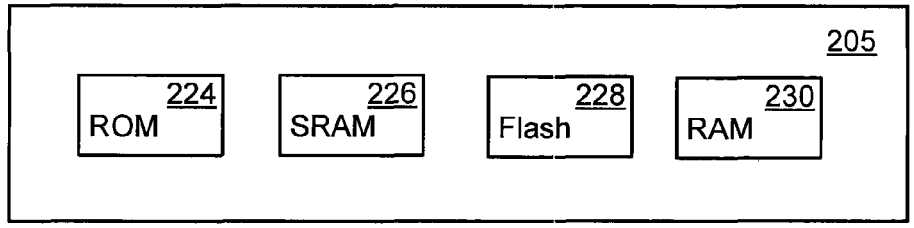
FIG. 2B is a block diagram of example memory devices.

Although the message data and the microcode have been described with reference to the first memory device 202 and the second memory device 204, respectively, the message data and microcode can also be stored in other configurations. In some implementations, portions of the message data can be stored in different memory devices. For example, portions of the secret can be stored in different memory devices (e.g., non-volatile memory devices such as battery-backed SRAM, ROM, EEPROM, FLASH, and fuses). Likewise, portions of the microcode can be stored in different memory devices. A single memory device can also store portions of the microcode and portions of the message data (e.g., the secret). As such, the message data and microcode can be stored in one or more memory devices 205 (e.g., in some implementations the one or more memory devices 205 include the first memory device 202 and the second memory device 204). The one or more memory devices 205 can include volatile memory devices and non-volatile memory devices. FIG. 2B is a block diagram of example memory devices 205. Exemplary memory devices 205 can include a ROM memory device 224, a battery backed SRAM memory device 226, a flash memory device 228, and a RAM memory device 230. For example, the ROM memory device 224 can store the microcode, the battery backed SRAM memory device 226 can store a portion of the secret, the flash memory device 228 can store another portion of the secret, and the RAM memory device 230 can store the message (e.g., a random number).

§2.3 Example Processing Unit

The data security system 102 includes a processing unit 206 configurable to execute the microcode to secure the message data. Thus the processing unit 206 can effect the steps, defined by the instructions/instruction set, necessary to implement the cryptographic algorithm to secure the message data. In one implementation, the processing unit 206 includes a shift/rotate unit 208, a multiplexer 210, an arithmetic logic unit 212, and an accumulator 214.

Generally, the processing unit 206 is configurable to accept the message data (e.g., the message and the secret) and/or constants stored by the memory devices 205. In some implementations, the shift/rotate unit 208 is configurable to accept bit blocks of message data stored by the first memory device 202 and/or constants stored by the second memory device 204, and shift/rotate (e.g., rotate right or rotate left) bits of the bit blocks and/or constants. In some implementations, the bit blocks and constants are provided to the shift/rotate unit 208 by the multiplexer 210, as explained below. However, in other implementations, the bit blocks are provided to the shift/rotate unit 208 directly from the first memory device 202. The operation of the shift/rotate unit 208 is controlled by the instruction set. For example, an instruction may cause the shift/rotate unit 208 to rotate bits in a bit block of the message data one bit position to the left in accord with a particular step or sequence of the cryptographic algorithm. In some implementations, the shift/rotate unit 208 is a barrel shifter.

In some implementations, the multiplexer 210 is configurable to accept the constants associated with the cryptographic algorithm from the second memory device 204 as a first input and bit blocks of the message data from the first memory device 202 as a second input. In accord with the instruction set, the multiplexer 210 selects either constants or bit blocks of message data, and provides the selection to the shift/rotate unit 208.

At the direction of the instruction set, the arithmetic logic unit 212 can perform arithmetic and logical operations on data (e.g., bit blocks of message data and/or constants) as required by steps or sequences of a cryptographic algorithm. To this end, the arithmetic logic unit 212 is configured to receive shifted/rotated bit blocks of message data, and/or constants. In some implementations, the arithmetic logic unit 212 can receive shifted/rotated bit blocks directly from the shift/rotate unit 208 (such bit blocks received directly from the shift/rotate unit 208 can include the constants). However, in other implementations, the arithmetic logic unit 212 can receive, separately, shifted/rotated bit blocks of message data and constants from the multiplexer 210, which receives the shifted/rotated bit blocks of message data from the shift/rotate unit 208 and receives the constants from the second memory device 204.

In some implementations, the arithmetic logic unit 212 can perform arithmetic addition, bitwise AND operations, bitwise XOR operations, and bitwise OR operations on the shifted/rotated bit blocks and/or the constants in accord with the instruction set. These types of operations are routinely required to implement a cryptographic algorithm. For example, a cryptographic algorithm that relies on SHA-1 includes the step/operations of (B AND C) OR (B AND D) OR (C AND D), where B, C, and D are variables derived, in part, from the bit blocks of message data. For such a cryptographic algorithm, this step/sequence of operations is defined in the instruction set and carried out by the arithmetic logic unit 212. The processing unit 206 can also include an accumulator 214.

The accumulator 214 can be a register (e.g., a 32-bit accumulator register). The accumulator 214 can aid the arithmetic logic unit 212 in performing arithmetic and logical operations by storing results (e.g., intermediate results) computed by the arithmetic logic unit 212 during the execution of the instruction set, or by otherwise storing data to be operated on by the arithmetic logic unit 212. For example, the arithmetic logic unit 212 can perform arithmetic and logical operations (addition, AND, OR, XOR, etc.) on the message data and the data stored in the accumulator 214 ("accum"), and then store the result back in the accumulator 214 (e.g., a bitwise AND instruction, math: accum=accum AND message data). The arithmetic logic unit 212 can also load data from the first memory device 202 into the accumulator 214 (e.g., a load instruction, load: accum=data), and load data from the microcode into the accumulator 214 (e.g., a load program memory instruction, Ipm: accum=progmem[PC2++]).

In some implementations, when the message data or a portion of the message data (e.g., digests are often generated in segments) has been processed, the secured data can be stored in the first memory device 202.

Although the processing unit 206 depicted in FIG. 2 shows one shift/rotate unit 208, one multiplexer 210, one arithmetic logic unit 212, and one accumulator 214, in some implementations the processing unit 206 can include one or more of the shift/rotate unit 208, multiplexer 210, arithmetic logic unit 212, and accumulator 214.

§2.4 Example Program Counter

The data security system 102 also includes a program counter 216. The program counter 216 can include multiple counters. The program counter 216 is configurable to identify an instruction in the instruction set being executed by the processing unit 206 and/or a next instruction in the instruction set to be executed by the processing unit 206. More generally, the program counter 216 can be used to track the execution of the microcode. In one implementation, the program counter 216 includes three microcode counters 220a-220c selectable by a two-bit select register 222.

§2.5 Example Index Register

In some implementations, directing addressing is used to determine the address of the first memory device 202. If direct addressing is used, then the address is determined based on the microcode, through use of an offset field. In other implementations, the address can be determined by indirect addressing. If indirect addressing is used, then the data security system 102 can include an index register 218. With indirect addressing the address is determined based on both the index register 218 and the offset field ("offset") from the microcode. In some implementations, the arithmetic logic unit 212 can store results data (e.g., secured message data or portions of processed message data) in the first memory device 202 ("ram") by use of the index register 218 (e.g., store instruction, store: ram[index+offset]=accum). However, other addressing schemes can also be used.

Figure 4:
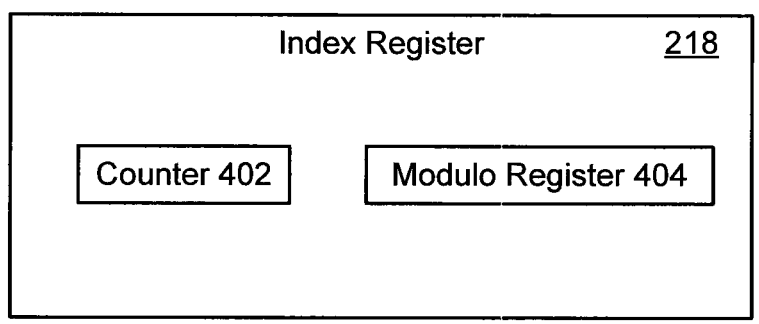
FIG. 4 is a block diagram of an example index register.

In some implementations, as shown in FIG. 4, the index register 218 can be implemented as a counter 402 where the address is based on the count value of the counter 402. In other implementations, the index register 218 can be implemented as a counter 402 and a modulo register 404 where the address is based on the count value modulo M (M being determined by the modulo register 404).

§2.6 Example Data Security System State/Control

The state of the data security system 102 can be determined by use of one or more registers. For example, the state of the data security system 102 can be determined by the program counter 216 having three counters used as microcode program counters, a two-bit select register that determines which of the three microcode program counters is the active program counter, the index register 218 (e.g., a seven-bit index register), the accumulator 214 (e.g., a 32-bit accumulator), and a single "fetch program data" bit (e.g., a load program memory (Ipm) instruction bit that permits the constants stored in the second memory device 204 to be accessed for use by the arithmetic logic unit 212). However, other state/control implementations can also be used to manage the operation of the data security system 102.

§3.0 Example Process for Securing Message Data

Figure 3A:
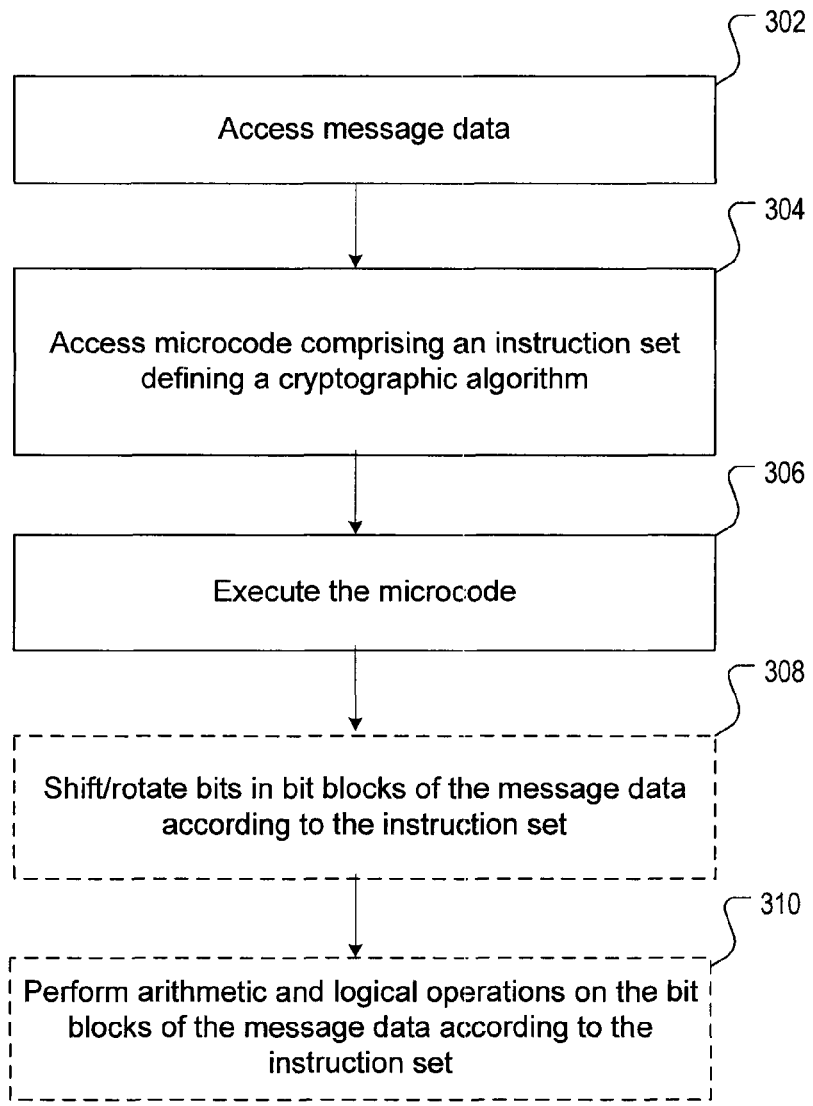
FIGS. 3A-3B are flow charts of example processes of securing data.
Figure 3B:
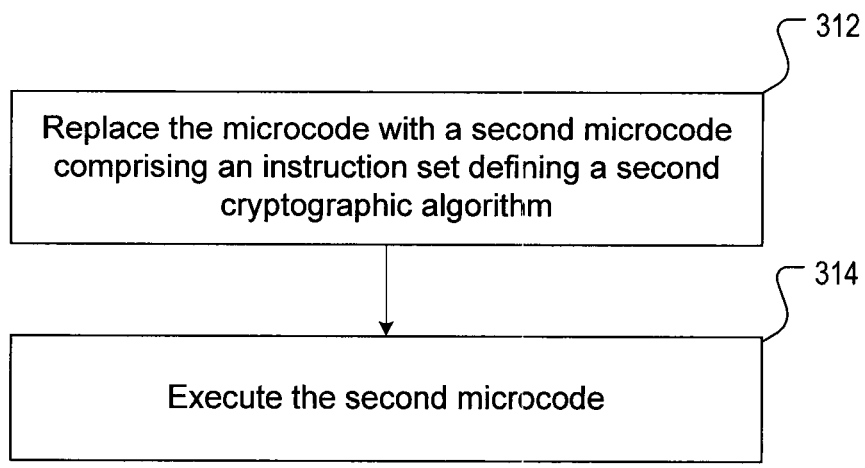

FIGS. 3A-3B are flow charts of example processes of securing data.

Message data to be secured is accessed (302). For example, the message data can be stored in and accessed from a memory device (e.g., the first memory device 202).

Microcode is accessed (304). The microcode includes an instruction set defining a cryptographic algorithm that can be used to secure the message data. The cryptographic algorithm can utilize, for example, a secure hash function, e.g., SHA-256, to secure the message data. The microcode can be stored in and accessed from a memory device (e.g., the second memory device 204).

The microcode is executed to secure the message data (306). For example, the microcode can be executed by a processing unit (e.g., processing unit 206). The processing unit can include a shifting/rotating unit (e.g., shift/rotate unit 208), an arithmetic logic unit (e.g., arithmetic logic unit 212), a multiplexer (e.g., multiplexer 210), and/or an accumulator (e.g., accumulator 214). In some implementations, the processing unit (e.g., processing unit 206 or the data security system 102, more generally) can execute the microcode at single cycle instruction execution speed.

Bits in bit blocks of the message data are shifted/rotated according to the instruction set (308). For example, bits can be shifted/rotated by a shifting/rotating unit (e.g., shift/rotate unit 208) in accord with the instruction set.

Arithmetic and logical operations are performed on the bit blocks according to the instruction set (310). For example, an arithmetic logic unit (e.g., arithmetic logic unit 212) can perform arithmetic and logical operations on the bit blocks of message data. The arithmetic and logical operations can include arithmetic addition, bitwise AND operations, bitwise XOR operations, and bitwise OR operations.

In some implementations, the microcode can be replaced by a second microcode comprising an instruction set defining a second cryptographic algorithm for use in securing the message data (312). For example, the second microcode can be stored in a memory device (e.g., the second memory device 204) and replace the previously stored microcode. Replacing the previously stored microcode with the second microcode permits the use of a different cryptographic algorithm to secure the message data.

The second microcode is executed to secure the message data (314). For example, the second microcode can be executed by the processing unit (e.g., processing unit 206) to secure the message data by use of the second cryptographic algorithm.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while process steps are depicted in the drawings in a particular order, this should not be understood as requiring that such process steps be performed in the particular order shown or in sequential order, or that all illustrated process steps be performed, to achieve desirable results.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

What is claimed is:

1. A data security system, comprising:
    a processing unit configurable to execute microcode;
    a first memory device configurable to store message data to be secured; and
    a second memory device configurable to store the microcode to be executed by the processing unit and constants, wherein the microcode comprises an instruction set defining a cryptographic algorithm for use in securing the message data, the instruction set comprising bitwise instructions corresponding to and implementing each step of the cryptographic algorithm, the bitwise instructions, upon execution by the processing unit, cause the processing unit to process bits of the message data according to each of the steps of the cryptographic algorithm, the system further including a program counter having more than one microcode counter selectable by a register and configured to identify an instruction in the instruction set being executed by the processing unit or a next instruction in the instruction set to be executed by the processing unit;
    a multiplexer coupled to the first memory device and the second memory device, the multiplexer configured to accept as inputs the constants from the second memory device and bit blocks of message data from the first memory device and to output the constants or the bit blocks of the message data in accord with the instruction set;
    a shift/rotate unit coupled to an output of the multiplexer, the shift/rotate unit configured to receive the bit blocks of the message data from the first memory device or the constants from the second memory device and to shift/rotate bits in the bit blocks or constants in accord with the instruction set from the second memory device;
    an arithmetic logic unit configured to receive the shifted/rotated bits and to perform arithmetic and logical operations on the shifted/rotated bits in accord with the instruction set; and
    an accumulator coupled to the arithmetic logic unit and the first memory device, the accumulator configured to facilitate the arithmetic and logical operations performed by the arithmetic logic unit and to store secured message data in the first memory.

2. The system of claim 1, wherein the cryptographic algorithm implements a secure hash function.

3. The system of claim 1, wherein the shifted/rotated bit blocks are bit blocks of 32 bits.

4. The system of claim 1, wherein the first memory device is a volatile memory device and the second memory device is a non-volatile memory device.

5. The system of claim 1, wherein
    the program counter is configurable to identify the instruction in the instruction set being executed by the processing unit or a next instruction in the instruction set to be executed by the processing unit.

6. The system of claim 1, wherein the second memory device is configurable to store another microcode to be executed by the processing unit, wherein the another microcode comprises the instruction set defining another cryptographic algorithm for use in securing the message data, the another cryptographic algorithm defined in the another microcode being different from the cryptographic algorithm defined in the microcode and the instruction set defining the another cryptographic algorithm comprising bitwise instructions corresponding to and implementing each and every step of the another cryptographic algorithm.

7. The system of claim 1, comprising:
    an index register configurable to provide an index value for use in determining an address of the first memory device.

8. The system of claim 7, wherein the index register comprises a counter.

9. The system of claim 7, wherein the index register comprises a counter and a modulo register.

* * * * *